US011063661B2

(12) United States Patent
Rothaar et al.

(10) Patent No.: US 11,063,661 B2
(45) Date of Patent: Jul. 13, 2021

(54) BEAM SPLITTING HAND OFF SYSTEMS ARCHITECTURE

(71) Applicant: Kymeta Corporation, Redmond, WA (US)

(72) Inventors: Bruce Rothaar, Woodinville, WA (US); Tim Mason, Kirkland, WA (US); Turner Noel, Redmond, WA (US); Luis Glass, Kirkland, WA (US); Abdolreza Shafie, Kirkland, WA (US); Mohsen Sazegar, Kirkland, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 16/432,624

(22) Filed: Jun. 5, 2019

(65) Prior Publication Data

US 2019/0379446 A1    Dec. 12, 2019

Related U.S. Application Data

(60) Provisional application No. 62/681,522, filed on Jun. 6, 2018.

(51) Int. Cl.
*H04B 7/19* (2006.01)
*H04B 7/185* (2006.01)

(52) U.S. Cl.
CPC .............. *H04B 7/18541* (2013.01)

(58) Field of Classification Search
CPC ................................. H04B 7/18541
USPC ............................. 455/12.1, 13.2
See application file for complete search history.

(56) References Cited

U.S. PATENT DOCUMENTS

| | | | | |
|---|---|---|---|---|
| 5,185,610 A | * | 2/1993 | Ward | H04B 7/24 342/357.24 |
| 5,559,806 A | * | 9/1996 | Kurby | H04B 7/18517 370/325 |
| 5,650,788 A | * | 7/1997 | Jha | H01Q 1/242 343/700 MS |
| 5,668,556 A | * | 9/1997 | Rouffet | H04B 7/2041 342/352 |
| 5,884,142 A | * | 3/1999 | Wiedeman | H04B 7/18556 455/12.1 |
| 5,912,641 A | * | 6/1999 | Dietrich | H04B 7/18534 342/354 |

(Continued)

FOREIGN PATENT DOCUMENTS

WO    2017-189862    11/2017

OTHER PUBLICATIONS

International Search Report and Written Opinion for Application No. PCT/US2019/035892, dated Oct. 2, 2019, 12 pages.

(Continued)

*Primary Examiner* — Hai V Nguyen
(74) *Attorney, Agent, or Firm* — Womble Bond Dickinson (US) LLP

(57) ABSTRACT

A beam splitting hand off systems architecture and method for using the same are disclosed. In one embodiment, the method comprises: generating a first beam with a single electronically steered flat-panel antenna to track a first satellite; generating a second beam with the single electronically steered flat-panel antenna to track a second satellite simultaneously while generating the first beam to track the first satellite; and handing off traffic from the first satellite to the second satellite.

25 Claims, 13 Drawing Sheets

(56) References Cited

U.S. PATENT DOCUMENTS

| | | | | |
|---|---|---|---|---|
| 5,945,946 A * | 8/1999 | Munger | H01Q 3/46 | 342/367 |
| 5,991,345 A * | 11/1999 | Ramasastry | H04B 7/18534 | 370/320 |
| 6,043,788 A * | 3/2000 | Seavey | H01Q 3/20 | 343/765 |
| 6,151,496 A * | 11/2000 | Richards | H01Q 3/08 | 455/428 |
| 6,321,088 B1 * | 11/2001 | Dempo | H04B 7/18541 | 370/331 |
| 6,507,319 B2 * | 1/2003 | Sikina | H01Q 3/04 | 342/367 |
| 6,511,020 B2 * | 1/2003 | Higgins | B64G 1/1007 | 244/158.4 |
| 6,553,226 B1 * | 4/2003 | Watson | H04B 7/18521 | 370/316 |
| 6,642,889 B1 * | 11/2003 | McGrath | H01Q 1/38 | 343/700 MS |
| 6,812,903 B1 * | 11/2004 | Sievenpiper | H01Q 3/12 | 343/753 |
| 6,822,622 B2 * | 11/2004 | Crawford | H01Q 15/002 | 343/754 |
| 6,847,801 B2 * | 1/2005 | de La Chapelle | H04B 7/18508 | 455/12.1 |
| 7,120,389 B2 * | 10/2006 | de La Chapelle | H04B 7/18508 | 455/12.1 |
| 7,339,520 B2 * | 3/2008 | Chang | H01Q 1/3275 | 342/359 |
| 7,391,381 B2 * | 6/2008 | Wang | G01S 3/14 | 342/375 |
| 7,656,345 B2 * | 2/2010 | Paschen | H01Q 19/08 | 342/75 |
| 7,786,933 B2 * | 8/2010 | Chang | G01S 19/36 | 342/357.63 |
| 8,035,562 B2 * | 10/2011 | Chang | G01S 19/21 | 342/417 |
| 8,232,918 B2 * | 7/2012 | Chang | G01S 19/36 | 342/368 |
| 8,713,324 B2 * | 4/2014 | Wahlberg | H04B 7/18567 | 713/182 |
| 9,363,712 B2 * | 6/2016 | Chuberre | H04W 36/0011 | |
| 9,435,893 B2 * | 9/2016 | Chang | H01Q 25/00 | |
| 9,711,850 B2 * | 7/2017 | Naym | H01Q 1/125 | |
| 9,766,345 B2 * | 9/2017 | Ozaki | H01Q 3/18 | |
| 9,991,948 B2 * | 6/2018 | Ozaki | H01Q 3/18 | |
| 2001/0045494 A1 * | 11/2001 | Higgins | H04B 7/18513 | 244/158.4 |
| 2002/0077099 A1 * | 6/2002 | LaPrade | H04B 7/18578 | 455/430 |
| 2003/0045231 A1 * | 3/2003 | Chapelle | H04B 7/18508 | 455/12.1 |
| 2003/0050008 A1 * | 3/2003 | Patterson | H04B 7/18578 | 455/12.1 |
| 2003/0203717 A1 * | 10/2003 | Chuprun | G06K 13/0825 | 455/12.1 |
| 2005/0070222 A1 * | 3/2005 | Chapelle | H04B 7/18508 | 455/12.1 |
| 2005/0146476 A1 * | 7/2005 | Wang | H01Q 1/3275 | 343/771 |
| 2008/0042897 A1 * | 2/2008 | Ghaleb | G01S 13/003 | 342/354 |
| 2008/0268838 A1 * | 10/2008 | Zufall | H04W 76/15 | 455/430 |
| 2008/0291079 A1 * | 11/2008 | Chang | G01S 19/28 | 342/174 |
| 2011/0012786 A1 * | 1/2011 | Chang | G01S 19/28 | 342/357.77 |
| 2011/0316739 A1 * | 12/2011 | Chang | H01Q 3/2605 | 342/357.62 |
| 2012/0326925 A1 * | 12/2012 | Chang | H01Q 3/267 | 342/357.59 |
| 2014/0150034 A1 * | 5/2014 | Frisco | H04N 21/41422 | 725/68 |
| 2015/0057881 A1 * | 2/2015 | Raab | H04M 1/72418 | 701/36 |
| 2015/0097727 A1 * | 4/2015 | Ozaki | H01Q 25/007 | 342/357.63 |
| 2015/0358861 A1 * | 12/2015 | Chuberre | H04B 7/18578 | 455/13.1 |
| 2016/0164173 A1 * | 6/2016 | Naym | H01Q 21/28 | 343/760 |
| 2016/0170029 A1 * | 6/2016 | Wyler | H01Q 3/26 | 342/354 |
| 2016/0249233 A1 * | 8/2016 | Murray | H04W 16/26 | |
| 2016/0276747 A1 * | 9/2016 | Davis | H01Q 19/062 | |
| 2017/0082753 A1 * | 3/2017 | Chang | G01S 19/36 | |
| 2017/0086255 A1 * | 3/2017 | Jayasimha | H04B 7/0837 | |
| 2017/0214456 A1 * | 7/2017 | Ozaki | H01Q 1/2291 | |
| 2018/0006373 A1 * | 1/2018 | Faler | H01Q 7/00 | |
| 2018/0098247 A1 * | 4/2018 | Gopal | H04L 47/122 | |
| 2018/0343055 A1 * | 11/2018 | Olson | B64G 1/10 | |
| 2018/0375570 A1 * | 12/2018 | Lofquist | H04B 7/18513 | |
| 2019/0280373 A1 * | 9/2019 | Adada | H01Q 1/34 | |
| 2019/0372656 A1 * | 12/2019 | Fang | H01Q 1/288 | |
| 2019/0379446 A1 * | 12/2019 | Rothaar | H04B 7/18541 | |

OTHER PUBLICATIONS

International Preliminary Report on the Patentability of Application No. PCT/US2019/035892, dated Dec. 17, 2020, 8 pages.

* cited by examiner

BEAM SPLITTING HAND OFF SYSTEMS ARCHITECTURE

PRIORITY

The present patent application claims priority to and incorporates by reference the corresponding provisional patent application No. 62/681,552, titled, "BEAM SPLITTING HAND OFF SYSTEMS ARCHITECTURE," filed on Jun. 6, 2018.

FIELD OF THE INVENTION

Embodiments of the present invention relate to the field of wireless communication; more particularly, the embodiments of the present invention relate to generating multiple beams simultaneously with a single satellite antenna to facilitate handing off communication between two satellites.

BACKGROUND OF THE INVENTION

A satellite terminal attempting to stay in communication with a constellation of nonstationary satellites can only point to a given satellite while that satellite is within the terminal's field of view. When the satellite leaves the field of view, the terminal must point to a different satellite that has recently entered the field of view. With only a single beam to point to any given satellite at any one time, the RF connection will be lost during the transition to a different satellite. That is, the satellite will have to break its connection with the satellite leaving its field of view so that it can make a connection with a new satellite that is entering or already in its field of view. This break-before-make connection results in a data outage, caused by time for the antenna to switch pointing angles, time for the tracking algorithms to optimize the pointing on the new satellite, time for the modem to lock to the new carrier, and time for the network to re-establish end-to-end connection.

SUMMARY OF THE INVENTION

A beam splitting hand off systems architecture and method for using the same are disclosed. In one embodiment, the method comprises: generating a first beam with a single electronically steered flat-panel antenna to track a first satellite; generating a second beam with the single electronically steered flat-panel antenna to track a second satellite simultaneously while generating the first beam to track the first satellite; and handing off traffic from the first satellite to the second satellite.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the invention include a method and system architecture to track nonstationary and stationary satellite constellations and handoff satellite traffic between two simultaneous and independent beams generated from a single electronically steered flat antenna such that connectivity is maintained throughout the transition from one satellite to another. In another embodiment, this includes the handoff of transmit traffic. By using the techniques disclosed herein, make-before-break handoffs between non-stationary, stationary satellite or spacecraft are enabled.

The techniques described herein include a number of innovations, such of which are described below. For example, in one embodiment, two beams are simultaneously generated with a single electronically steered flat antenna to track two satellites within the constellation and then seamlessly hand off traffic from an initial satellite to a new, subsequent satellite.

In one embodiment, one electronically steered antenna is used for executing make-before-break connections in which an RF connection is made with the new satellite before the RF link is broken with the existing satellite.

Figure 1:
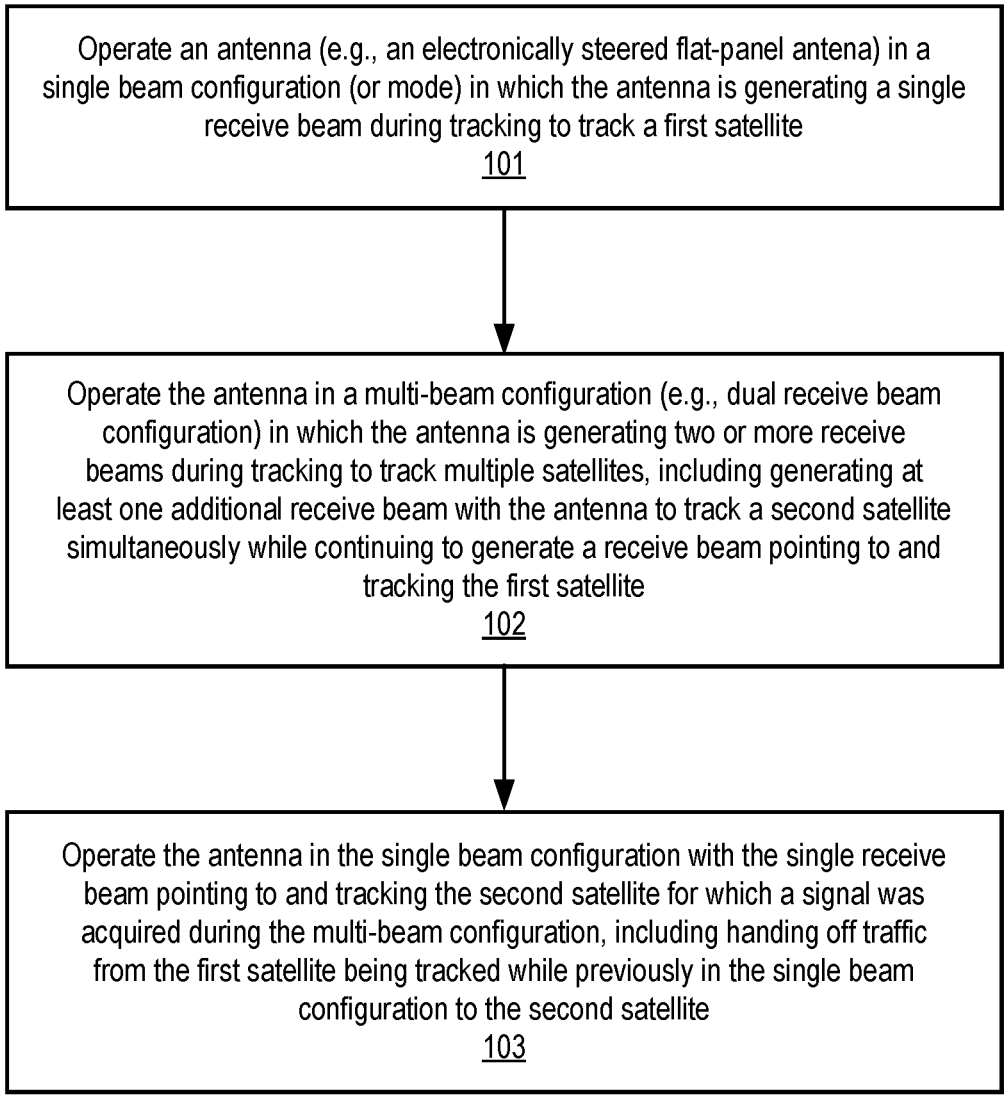
FIG. 1 is a flow diagram of one embodiment of a method for using a satellite antenna for communication.

FIG. 1 is a flow diagram of one embodiment of a method for using a satellite antenna for communication. In one embodiment, the processes are performed by processing logic that may comprise hardware (e.g., circuitry, dedicated logic, etc.), software (e.g., software running on a chip), firmware, or a combination of the three. In one embodiment, the satellite antenna is a flat-panel antenna. In another embodiment, the satellite antenna is an electronically steered flat-panel antenna. Examples of such electronically steered flat-panel antennas are described in more detail below.

Referring to FIG. 1, the process begins by processing logic operating an antenna (e.g., an electronically steered flat-panel antenna) in a single-beam configuration (or mode) in which the antenna is generating a single receive beam during tracking to track a first satellite (processing block 101). In one embodiment, operating the antenna in the single-beam configuration includes generating an electronically steered antenna beam pattern for beamforming, sending the beam pattern to an antenna aperture of an electronically steered flat-panel antenna having a set of RF radiating antenna elements (e.g., surface scattering metamaterial antenna elements, such as, for example, but not limited to, those described below), and generating a receive beam with the RF radiating antenna elements based on the antenna pattern.

Subsequently, processing logic operates the antenna in a multi-beam configuration (e.g., a dual-receive beam configuration) in which the antenna is generating two or more receive beams during tracking to track multiple satellites, including generating at least one additional receive beam with the antenna to track a second satellite simultaneously while continuing to generate a receive beam pointing to and tracking the first satellite (processing block 102). In one embodiment, when the multi-beam mode is in a dual-beam mode, the antenna generates two receive beams for pointing to and tracking two satellites, where the two satellites include the satellite to which the antenna was pointing and tracking during the previous single-beam configuration and a new satellite from which the antenna acquired a signal and began tracking with the second beam while in the multi-beam configuration.

Thereafter, after tracking of an additional satellite, processing logic returns to operating the antenna in the single-beam configuration with the single receive beam pointing to and tracking the new satellite for which a signal was acquired during the multi-beam configuration, including handing off traffic from the satellite being tracked while in the previous single-beam configuration to the new satellite (processing block 103). In one embodiment, handing off traffic is performed seamlessly such that connectivity is maintained throughout the transition from the previously tracked satellite to the new satellite.

Figure 2:
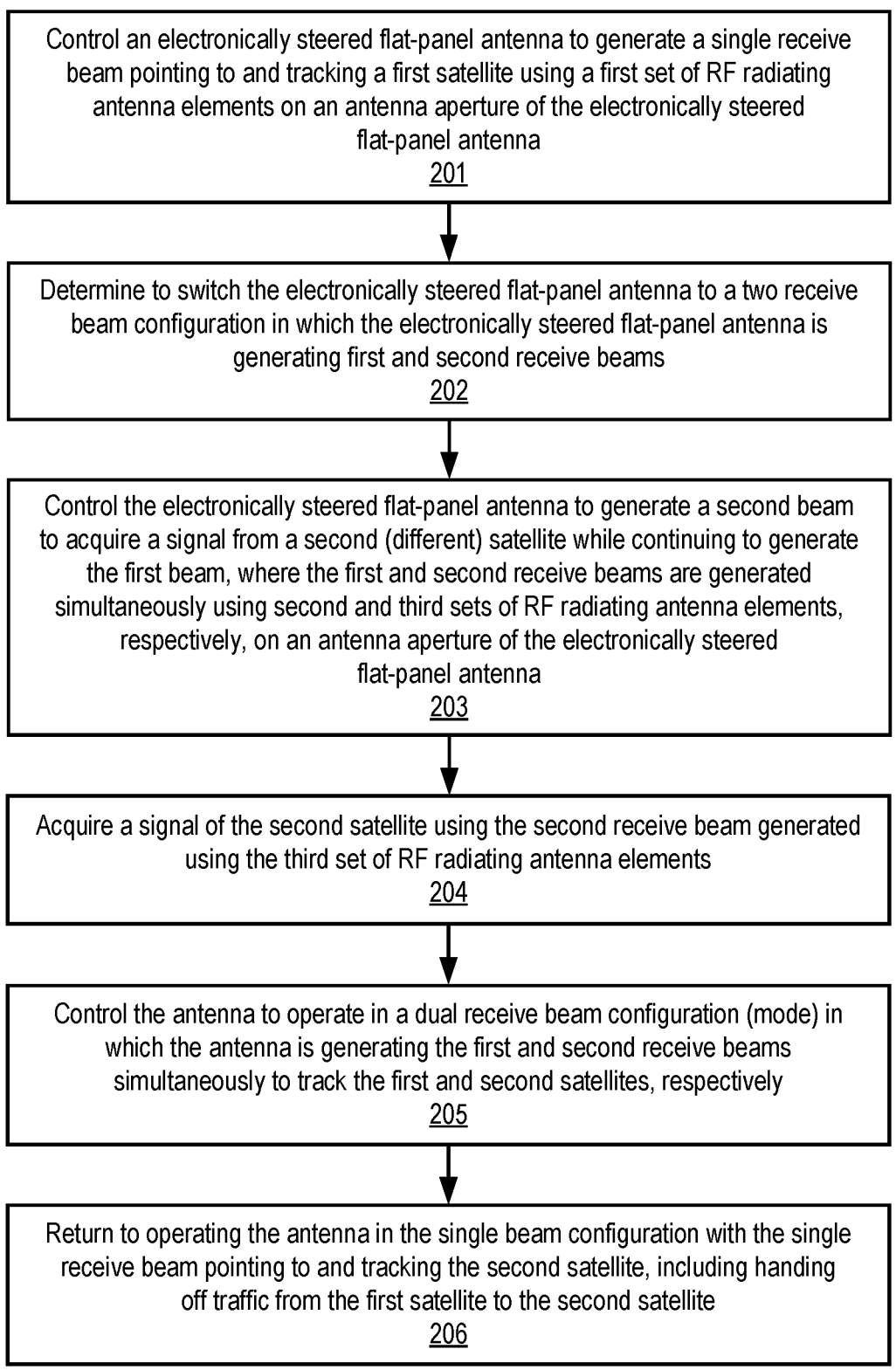
FIG. 2 is a flow diagram of one embodiment of a method for using a satellite antenna for communication.

FIG. 2 is a flow diagram of one embodiment of a method for using a satellite antenna for communication. In one embodiment, the processes are performed by processing logic that may comprise hardware (e.g., circuitry, dedicated logic, etc.), software (e.g., software running on a chip), firmware, or a combination of the three. In one embodiment, the satellite antenna is a flat-panel antenna. In another embodiment, the satellite antenna is an electronically steered flat-panel antenna. Examples of such electronically steered flat-panel antennas are described in more detail below.

Referring to FIG. 2, the process begins by processing logic controlling an electronically steered flat-panel antenna to generate a single receive beam pointing to and tracking a first satellite using a first set of RF radiating antenna elements (e.g., surface scattering metamaterial antenna elements, such as, for example, but not limited to, those described below) on an antenna aperture of the antenna (processing block 201). In one embodiment, processing logic controls the antenna by generating an electronically steered antenna pattern for beamforming, sending the receive beam pattern to an antenna aperture of the antenna that has a set of RF radiating antenna elements, and generating the single receive beam with the first set of RF radiating antenna elements based on the pattern.

While tracking the first satellite, processing logic makes a determination to switch the antenna into a two-receive beam configuration in which the antenna is generating first and second receive beams simultaneously (processing block 202). In one embodiment, this determination to switch the antenna into a two-beam configuration is made when the antenna is leaving the field of view of the first satellite and needs to find a second satellite for continuing communications.

After determining to switch to a two-receive beam configuration, processing logic controls the antenna to generate a second beam to acquire a signal from a second (different) satellite while continuing to generate the first beam to track the first satellite, where the first and second receive beams are generated simultaneously using two sets of RF radiating antenna elements, respectively, of an antenna aperture (processing block 203) and then acquires a signal of the second satellite using the second beam (processing block 204). In this case, the first beam remains pointing to and tracking the first satellite while the second beam is pointing to the second satellite.

In one embodiment, the first and second beams point at carriers that are at different frequencies. In one embodiment, the first and second beams have different antenna gains, wherein gain for the second beam is lower than the gain for the first beam. In one embodiment, this occurs when the second beam is used for acquiring the signal from the second satellite. In one embodiment, the second beam is wider than the first beam when used for acquiring the signal from the second satellite. In one embodiment, the beam is made wider to allow capture of a signal when there is some uncertainty as to the exact location of the signal. In one embodiment, the amount to widen the beam depends on the degree of uncertainty about the location of the signal. In one example embodiment, if the beam during pointing and tracking is less than 2 degrees wide, then the beam for acquisition is broadened to about (but not limited to) 10 degrees wide. Note that this is merely an example, and the beam is not limited to being 10 degrees wide during acquisition. However, if the beam is too wide there is a risk of picking up another satellite.

In one embodiment, the RF radiating antenna elements of the two sets for generating the two beams simultaneously are different from each other but are part of the RF radiating antenna elements of the antenna. In one embodiment, the two sets of RF radiating antenna elements for generating the two beams simultaneously when operating the antenna in a dual-receive beam configuration are part of, or comprise all of, the RF radiating antenna elements that are used for generating one beam when operating the antenna in a single-beam configuration.

In one embodiment, the two sets of RF radiating antenna elements have a different number of RF radiating antenna elements (e.g., 75% of the antenna elements used for generating the first beam and 25% of the antenna elements used for generating the second beam during signal acquisition). The number of elements used to generate each of the beams depends on the satellites for a minimum gain level. In one embodiment, for specific satellites/scenarios, there could be 10+dB signal-to-noise ratio (SNR) so the two radiation patterns could be offset by that much. However, in other scenarios, differences of more or less than 10+dB may be sufficient.

In one embodiment, the antenna aperture includes a set of RF antenna elements dedicated for use in signal acquisition of a new satellite with the second beam.

In one embodiment, the second and third sets of RF radiating antenna elements are in rings around a central feed for a feed wave, and further wherein each ring of the second set of RF radiating antenna elements is between rings of RF radiating antenna elements in the third set of RF radiating antenna elements. In one embodiment, the second and third sets of RF radiating antenna elements are in rings around a central feed for a feed wave, with the second set of RF radiating antenna elements being in rings closest to the central feed in comparison to rings of the third set of RF radiating antenna elements. Examples of the rings are described in more detail below. For example, in FIG. 6, every odd or even numbered ring may be used for the second set of RF radiating elements, while the other rings are used for the third set of RF radiating elements. Similarly, in FIG. 6, the set of rings closest to the cylindrical feed may be used for the second set of RF radiating elements, while the other rings are used for the third set of RF radiating elements.

In one embodiment, the second pattern that is applied to the RF radiating elements to point the second receive beam points to a predicted location of the second satellite. In one embodiment, the predicted location is based on commanded two-line elements (TLE).

After signal acquisition of the second satellite, processing logic controls the antenna to operate in a dual-receive beam configuration (mode) in which the antenna is generating the first and second receive beams simultaneously to track the first and second satellites, respectively (processing block 205). In one embodiment, when in a dual-receive beam mode, the antenna generates two receive beams for pointing to and tracking two satellites simultaneously, where the two satellites include the satellite to which the antenna was pointing and tracking during the single-beam configuration prior to signal acquisition of the second satellite and the second satellite from which the antenna acquired a signal and began tracking while in the multi-beam configuration.

Thereafter, after tracking of the second satellite has begun, processing logic returns to operating the antenna in the single-beam configuration with the single receive beam pointing at and tracking the second satellite, including handing off traffic from the first satellite to the second satellite (processing block 206). In one embodiment, handing off traffic is performed seamlessly such that connectivity is maintained throughout the transition from the first satellite to the second satellite. In one embodiment, the handing off of traffic between the first and second satellites occurs in a manner well-known in the art of switching traffic between satellites.

Techniques described above are performed by an antenna that is used in satellite communication. In one embodiment, the antenna comprises an electronically steered flat-panel antenna aperture with a plurality of electronically controlled radio frequency (RF) radiating antenna elements (e.g., surface scattering metamaterial antenna elements or resonators such as, for example, described in more detail below), and one or more processors coupled to the antenna aperture to control the antenna aperture such that the antenna aperture generates a first beam with the antenna aperture to track a first satellite, generates a second beam with the antenna aperture to track a second satellite simultaneously while generating the first beam, and hands off traffic from the first satellite to the second satellite. In one embodiment, the processor hands off traffic seamlessly between the first and second satellites such that connectivity is maintained throughout the transition from the first satellite to the second satellite.

In one embodiment, prior to generating the second beam to track the second satellite, a processor controls the antenna aperture to generate the second beam to acquire a signal from the second satellite while generating the first beam. In one embodiment, the processor generates first and second patterns to apply to first and second sets of first and second sets of radio-frequency (RF) radiating antenna elements, respectively, of the antenna aperture to generate the first and second beams, respectively, to point at carriers that differ in frequency.

Figure 3:
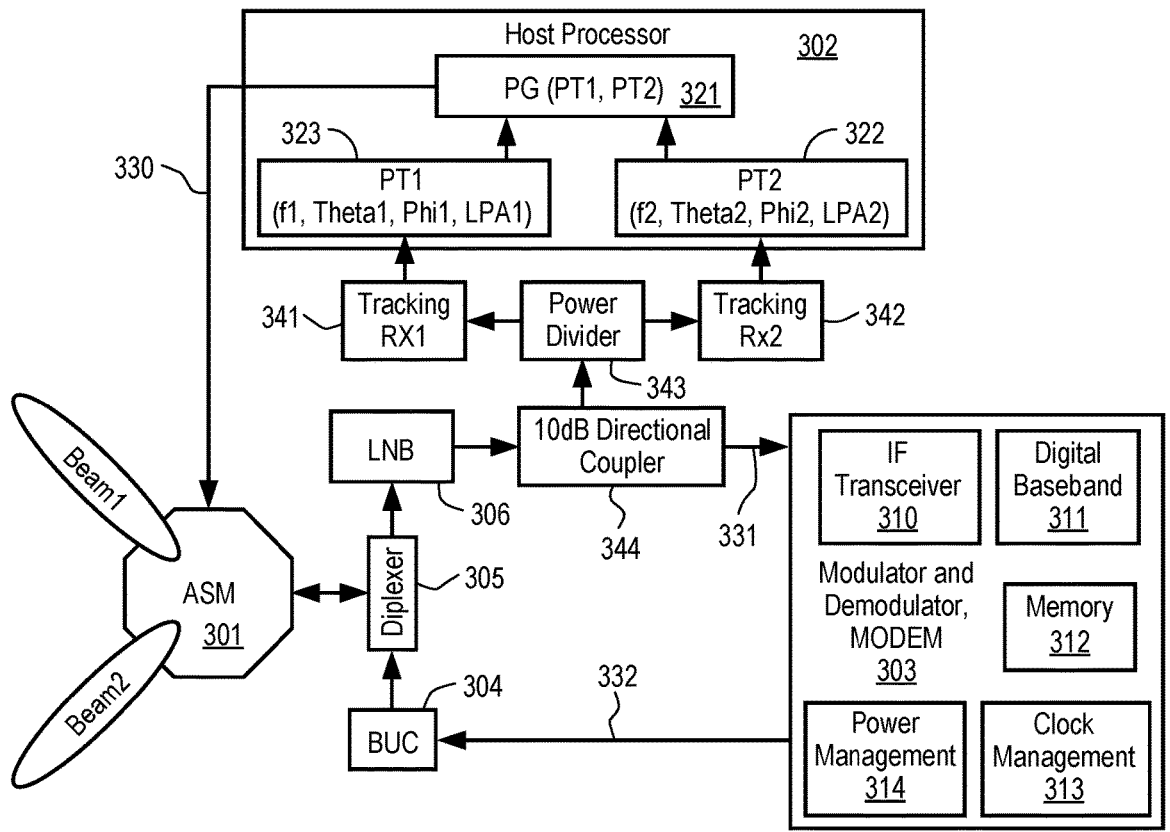
FIG. 3 illustrates one embodiment of a beam splitting antenna system.

FIG. 3 is an example of a satellite antenna architecture that is capable of generating one receive beam or two receive beams simultaneously to facilitate handing off communication between two satellites.

Referring to FIG. 3, host processor 302 receives satellite location (e.g., latitude and longitude) and polarization information, and in response to these inputs, performs antenna receive pointing by generating pointing and tracking information that is provided to and controls antenna elements of an antenna aperture of antenna system module (ASM) 301. Examples of such an antenna aperture having RF radiating antenna elements (e.g., surface scattering antenna elements or resonators) are described in more detail below. In one embodiment, the pointing and tracking information is associated with electronically controlled antenna wave patterns that are used to control the RF radiating antenna elements as described herein.

In one embodiment, the pointing and tracking information comprises a pointing angle (e.g., theta, phi), frequency information and symbol rate information. The theta range may be [0,90] degrees, the phi range may be [0,360] degrees. In one embodiment, host processor 302 also generates polarization values that are provided to the antenna aperture of ASM 301. The polarization value may range from [0,360] degrees. In one embodiment, the polarization values are generated by host processor 302 in a manner well-known in the art.

The receive portion of antenna aperture of ASM 301 uses the new pointing angle to generate a beam to obtain an RF signal from a satellite and provide it to modem 303. In one embodiment, when only one set of pointing information is sent by host processor 302 to ASM 301, the antenna aperture of ASM 301 generates one receive beam using all of the RF radiating antenna elements that are designated for receive transmissions (as opposed to those used for transmit) and the receive beam is used to obtain the RF signal from the satellite.

In response to a received RF signal, modem 303 generates receive metrics (e.g., SNR, C/N, etc.) regarding the Rx signal being received. In one embodiment, the receive metrics indicate whether the satellite signal has been found based on whether the signal meets one or more predetermined criterion (e.g., SNR or C/N greater than a predetermined threshold) in a manner well-known in the art.

In one embodiment, host processor 302 provides two sets of pointing and tracking information to the antenna aperture of ASM 301, where each set of pointing and tracking information is for controlling a different set of antenna elements of the antenna aperture of ASM 301, to enable ASM 301 to generate beams 1 and 2. That is, host processor 302 sends two sets of pointing and tracking information to ASM 301 to generate two receive beams simultaneously using different sets of antenna elements of the antenna aperture of ASM 301. In one embodiment, the two receive beams are generated by dividing one set of antenna elements into two groups (e.g., every other ring of antenna elements, or every other antenna element in a ring or distribution, or randomly distributed) and forming two independent beams, at the same frequency or at different frequencies within the dynamic bandwidth of that element type. This can be at different thetas or at the same theta.

In one embodiment, in order to generate an electronically steered antenna pattern, host processor 302 sends commands to an antenna control process (ACP) module on ASM 301 to start tracking a target satellite, and in response to the information, the ACP module sends setup information and continuously calculates and sends pointing vectors to a service. In one embodiment, the ACP module sends setup and pointing information comprised of an operating frequency (e.g., f1, f2) and polarization values for the antenna aperture at ASM 301 as setup information and a pointing vector having theta, phi and linear polarization angle (LPA) values as the pointing information to the pattern generation service.

In response to the setup and pointing information, the service provides a plurality of electronically steered antenna patterns that control antenna elements (e.g., RF radiating antenna elements (e.g., metamaterial scattering antenna elements)) of the antenna aperture to form the two receive beams. In one embodiment, this service comprises a software service that is executed by one or more processors of ASM 301. In another embodiment, this service comprises hardware on ASM 301.

In one embodiment, pattern generation service loads beamforming parameters into an FPGA corresponding to the patterns. In response, the FPGA outputs the pattern to the antenna elements of the electronically steered antenna in the form of digital-to-analog (DAC) values (for each pattern). More specifically, a DAC value for each antenna element in the antenna aperture is calculated by the FPGA using the beamforming parameters provided by the pattern generation service. The FPGA then outputs control signals to the antenna elements to drive the calculated pattern. In one embodiment, the DAC values control thin film transistors (TFTs) in order to control the antenna elements of the antenna aperture (not shown) to generate a beam. Examples of TFT and their control are described in more detail below.

After each of the two beams, beam 1 and beam 2, has been formed in response to patterns generated by the pattern generation service of ASM 301, a receiver on ASM receives a signal back from the use of each receive beam and provides that to diplexer 305. From diplexer 305, the signals are processed by Low Noise Block (LNB) 306, which performs a noise filtering function and a down conversion and amplification function in a manner well-known in the art. Note that in FIG. 3, in one embodiment, as the signals from the two beams are different in frequencies, LNB 306 covers both frequencies simultaneously. In one embodiment, LNB 306 is in an out-door unit (ODU). In another embodiment, LNB 306 is integrated into the antenna apparatus.

After signal processing by LNB 306, the signal is sent to a directional coupler 344, which couples energy from the received signal output from LNB 306 to an Rx power divider 343 and to modem 303 (as signal 331). In one embodiment, directional coupler 344 is a 10 dB directional coupler; however, other couplers may be used.

Rx power divider 343 splits the signal received from directional coupler 344 into two signals and sends one signal to tracking receiver 341 and the other signal to tracking receiver 342. In one embodiment, the signals are split based on frequency, such that the signals associated with beam 1 are sent to one of tracking receivers 341 and 342, while the signals associated with beam 2 are sent to the other of tracking receivers 341 and 342. Note that if the antenna is operating in a single-beam mode and only generating one receive beam, then Rx power divider 343 provides the one signal to only one of tracking receivers 341 or 342 and no signal to the other. In one embodiment, Rx power divider is a diplexer. Alternatively, Rx power divider 343 comprises a power splitter or a frequency adjustable filter.

In response to signal 331, modem 303 processes signal 331 in manner well-known in the art. More specifically, modem 303 includes an analog-to-digital converter (ADC) to convert the received signal output from directional coupler 331 into digital format. Once converted to digital format, the signal is demodulated by a demodulator and decoded by decoder to obtain the encoded data on the received wave. The decoded data is then sent to a controller, which sends it to its destination (e.g., a computer system).

Modem 303 also includes an encoder that encodes data to be transmitted. The encoded data is modulated by a modulator and then converted to analog by a digital-to-analog converter (DAC) (not shown) to produce analog signal 332. Analog signal 332 is then filtered by a BUC (a block upconverter) 304 and provided to one port of diplexer 305. In one embodiment, BUC 304 is in an out-door unit (ODU). Diplexer 305 operating in a manner well-known in the art provides the transmit signal 332 to ASM 301 for transmission.

In one embodiment, to support its operations, modem 303 includes an intermediate frequency (IF) transceiver 310 to process transmit and receive signals at an intermediate frequency, a digital baseband processor 311 to process down-converted digital signals to retrieve data for a digital system, memory 312 stores parameters, data tables, and other information used by the modem to perform modulation, demodulation and its other functions, a clock management unit 313 to managing clocking of operations of modem 303, and a power management unit 314 to manage power consumption of modem 303. These unit operate in a manner well-known in the art unless specified otherwise.

In operation, in one embodiment, as one satellite begins to leave the field of view of the terminal, the antenna aperture of ASM 301 is controlled so that it changes from the single-beam configuration into two beams and begins setting up a connection with the next satellite with the second beam. In one embodiment, the second beam is only for locating and connecting with the next satellite and not transmitting large amounts of data, and thus the gain of the second beam with respect to the primary beam is lower, allowing for reduced, and potentially minimal, impact onto the data transmission rates of the satellite terminal.

In one embodiment, two beams are generated simultaneously with a single electronically steered flat antenna in order to access a satellite, and then a handoff of traffic from a first beam to a second beam happens seamlessly, whereas the first beam and the second beam are pointed at the same satellite, yet are accessing satellite carriers on distinct frequencies. An example of this is shown in FIG. 4.

Figure 4:
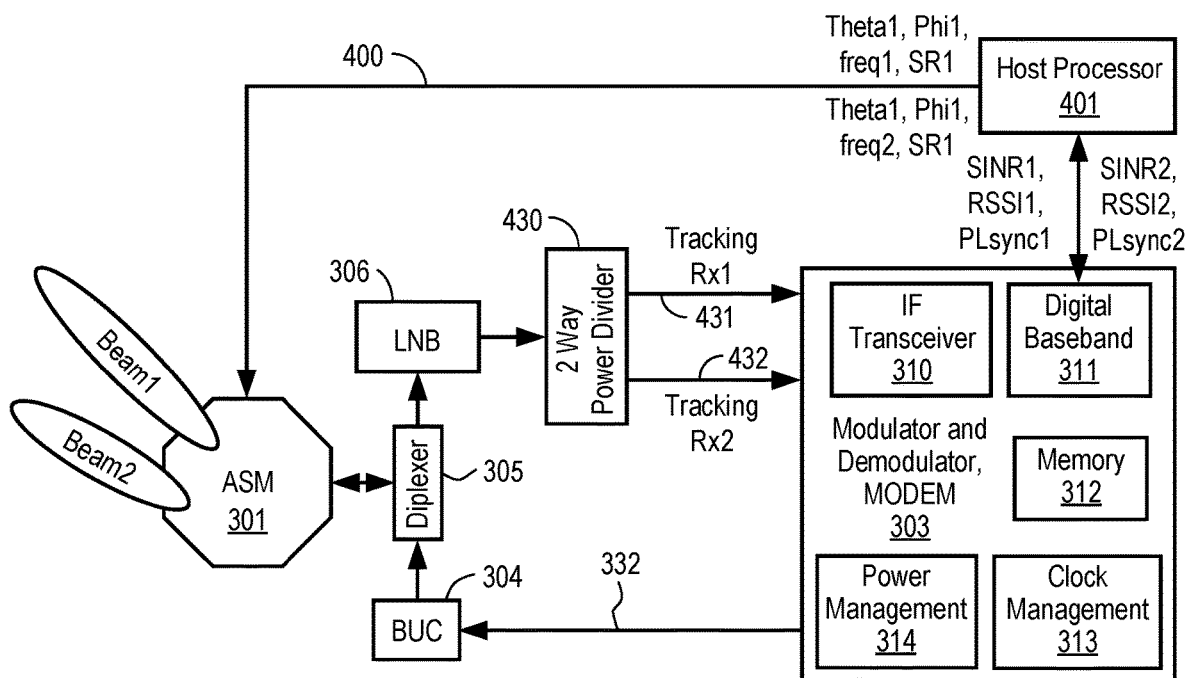
FIG. 4 is a block diagram of an alternative beam splitting antenna system.

Referring to FIG. 4, host processor 401 generates pointing and tracking information 400 and sends it to ASM 301 for one or two receive beams. In one embodiment, pointing and tracking information 400 includes theta (e.g., Theta1), phi (e.g., Phi1), frequency (e.g., freq1, freq2), and symbol rate (e.g., SR1) information. This may be in response to signal quality information or metrics, such as, for example, SINR values (e.g., SINR1, SINR2) or Received Signal Strength Indicator (RSSI) (e.g., RSSI1, RSSI2) associated with received signals associated with received beams 1 and 2. In one embodiment, this is in response to physical layer synchronization signals (e.g., PLsynch1, PLsynch2) that indicate that the antenna beam is tracking a satellite. In one embodiment, the signal quality information or metrics and sync signals are received from modem 303.

Using beams 1 and 2, the antenna aperture of ASM 301 receives signals from one or two satellites. The received signals are sent to diplexer 305 and then to LNB 306, which operates as discussed above. From LNB 306, the signals are sent to 2-way power divider 430, which divides the received signal into tracking receive signal (Rx1) 431 and tracking receive signal (Rx2) 432. In one embodiment, tracking receive signal (Rx1) 431 and tracking receive signal (Rx2) 432 terminate at an RF tuner inside modem 303 where the frequency selection occurs. In this case, power divider 430 is a simple power splitter. In another embodiment, power divider 430 operates as a bandpass filter to filter the incoming signal to produce tracking receive signal (Rx1) 431 and tracking receive signal (Rx2) 432. These signals are sent to modem 303 and processed as described above.

Although not shown in FIG. 4, in one embodiment, a second splitter/power divider is placed before LNB 306 and is included to split between Rx1 and Rx2.

In one embodiment, a second beam is generated with an electronically steered flat antenna and pointed based on the estimate of the new satellite location provided by two-line elements (TLE), which is a list of orbital elements of an Earth-orbiting object for a given point in time, and then that estimate of a second satellite location is improved using modem signal feedback for optimization.

In one embodiment, an unequal beam split is generated, thereby, with one antenna producing two beams with different gains (e.g., gains differ by approximately 10 dB for High-Throughput Satellites (HTS), etc.), such that the original beam maintains data communication and tracks a first satellite, while the second lower-gain beam is used to optimize the beam pointing towards the new incoming satellite.

In one embodiment, the antenna used in the above embodiments can be duplex apertures, supporting simultaneous transmit and receive functions, rather than a receive-only aperture, thereby providing for handoff of transmit traffic as well as handoff of receive traffic.

In one embodiment, the handoff of transmit traffic occurs for two distinct satellites from satellites used for receive traffic, i.e., the transmission satellites and reception satellites do not necessarily have to be the same.

The techniques disclosed herein may be applied to, for example, but not limited to, GEO (geostationary), MEO (medium earth orbit), LEO (low earth orbit), any nonstationary and stationary satellite constellations, as well as multiple spacecraft with tracking capability implemented using electronically steered antennas systems that do not require moving mechanical parts to steer a beam.

For instance, in one LEO constellation, satellites are in the field of view of the ground terminal for short period of time, e.g., on the order of 4 minutes, and every passing satellite is replaced by another incoming satellite, such that there is overlap for satellite connectivity. The LEO satellite locations as a function of time are typically known via two-line elements, TLE, and are communicated to the ground terminal during the satellite connectivity. As the moment of a satellite handoff approaches, the ground terminal creates a second antenna beam and points that beam in the direction specified by the TLE for the incoming satellite, and does so before the outgoing satellite is no longer in the field of view, thereby providing make-before-break capability. In one embodiment, the ground terminal is able to track and deliver user traffic from a first beam pointed at a first LEO satellite while simultaneously acquiring a new incoming LEO satellite with a second beam, after which it manages a seamless handoff of traffic from the first beam to the second beam and then turns off the first beam, thereby providing continuous service to its users.

Embodiments of the invention provide continuous satellite connectivity. In one embodiment, the purpose of the beam splitting is to reduce, and potentially eliminate the amount of time the connectivity is interrupted between satellite hand-offs. Since these hand-offs will occur repeatedly as LEO satellites orbit, any reduction in connectivity disruption improves the user experience with less drops in connectivity.

Figure 5A:
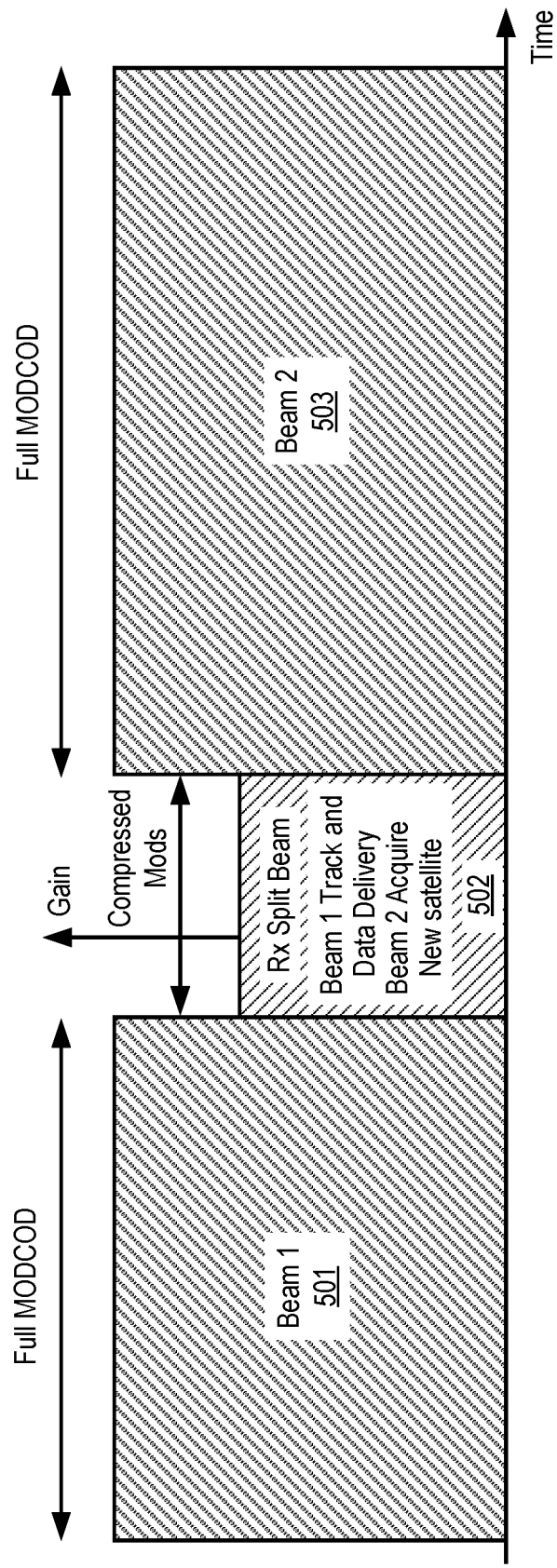
FIG. 5A is an antenna beam switching timing diagram to track and hand off satellites.

FIG. 5A is a timing diagram of one embodiment of a process in which one receive beam is split to two receive beams. The original beam (Beam 1) 501 is used for Forward Link data, aka FL, whereas the split beam, beam 2, in the split beam period 502 is utilized to track the incoming LEO satellite. The FL refers to the signal started from the Ground Network (GN) (aka HUB) and ending at the terminal. In one embodiment, the two beams do not have equal antenna gain. In one embodiment, the second beam, beam 2, is given sufficient antenna gain so the terminal Rx modem can use the split beam signal for acquiring the incoming satellite. Once the incoming satellite is acquired, then FL handoff takes place. In one embodiment, FL data capacity is limited by the received signal strength (e.g., signal-to-noise ratio (SNR)) and determined by GN. During the beam split period 502, the data capacity is lowered because the traffic bearing beam will have lower antenna gain than normal, shown as compressed mode in FIG. 5A. The compressed mode stands for reduced modulation and coding scheme (MODCOD) (e.g., MCS) due to splitting the beam, i.e., reduced antenna gain, just long enough to track and connect to the incoming satellite. Once the split beam period 502 is complete, the traffic bearing beam (e.g., beam 2 going forward) can be returned to full antenna gain.

Figure 5B:
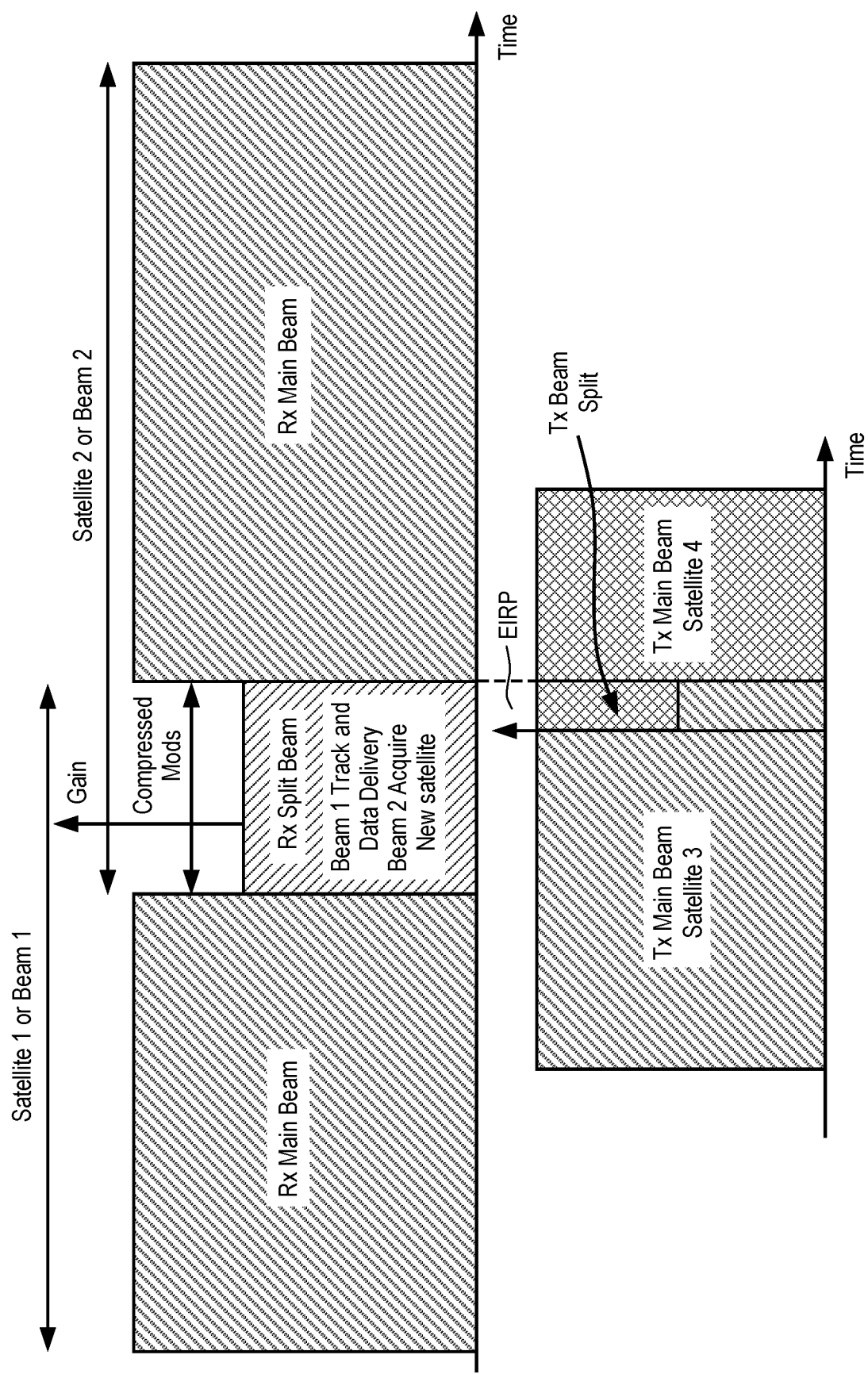
FIG. 5B illustrates an example of a transmit (Tx) beam splitting and handoff and corresponding timing diagram.

In one embodiment, the techniques described herein also extend to reverse link, RL, connectivity, which would be established as soon as FL is handed off. In other words, although a FL handoff is discussed above, the RL handoff also occurs due to antenna duplex capabilities. FIG. 5B illustrates an example of a transmit (Tx) beam splitting and handoff and corresponding timing diagram. Referring to FIG. 5B, the Tx beam splitting does not necessarily occur for the same satellite or beam as for receive (Rx) beam splitting. It could however be the very same satellite or beam.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
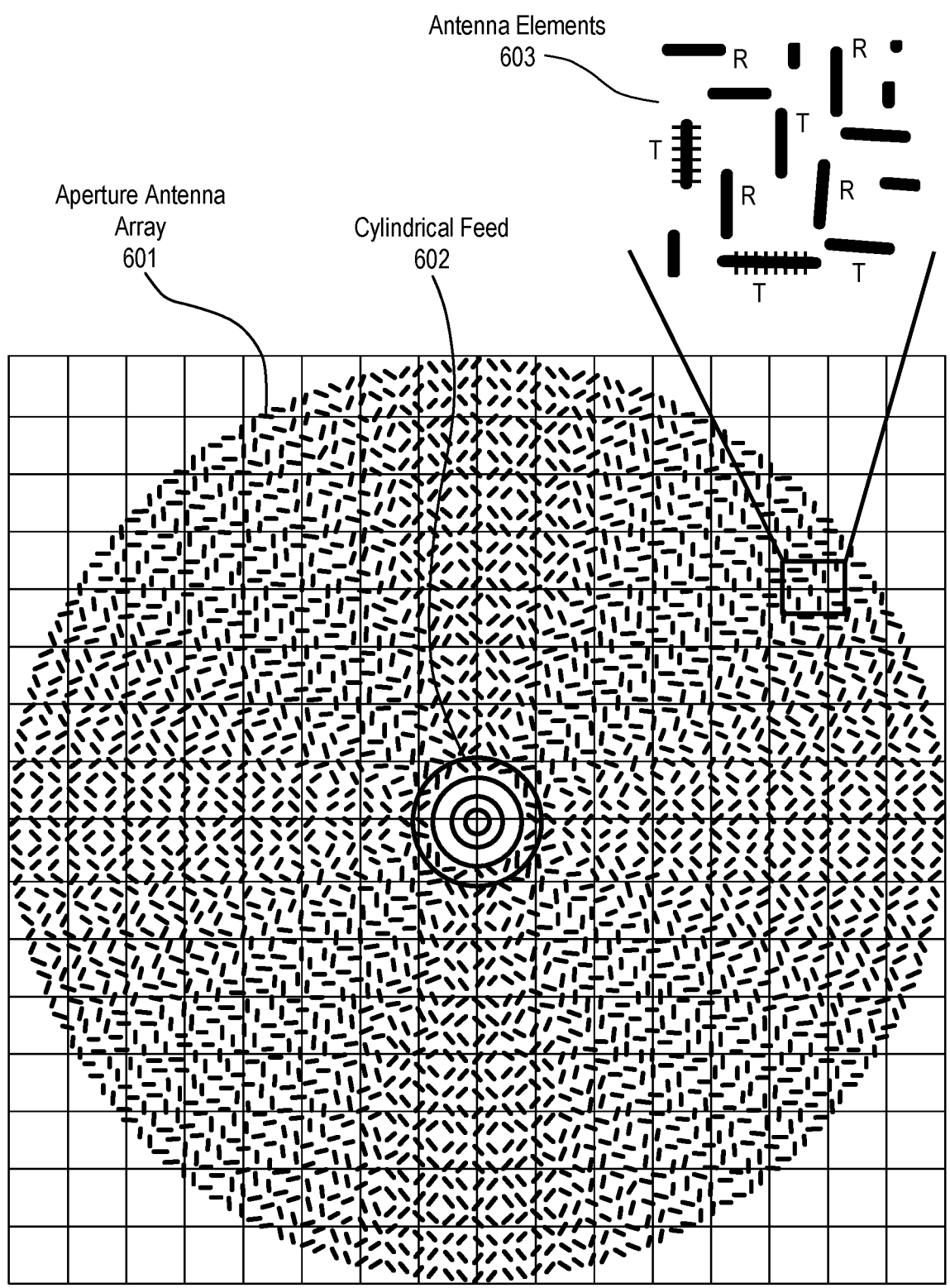
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
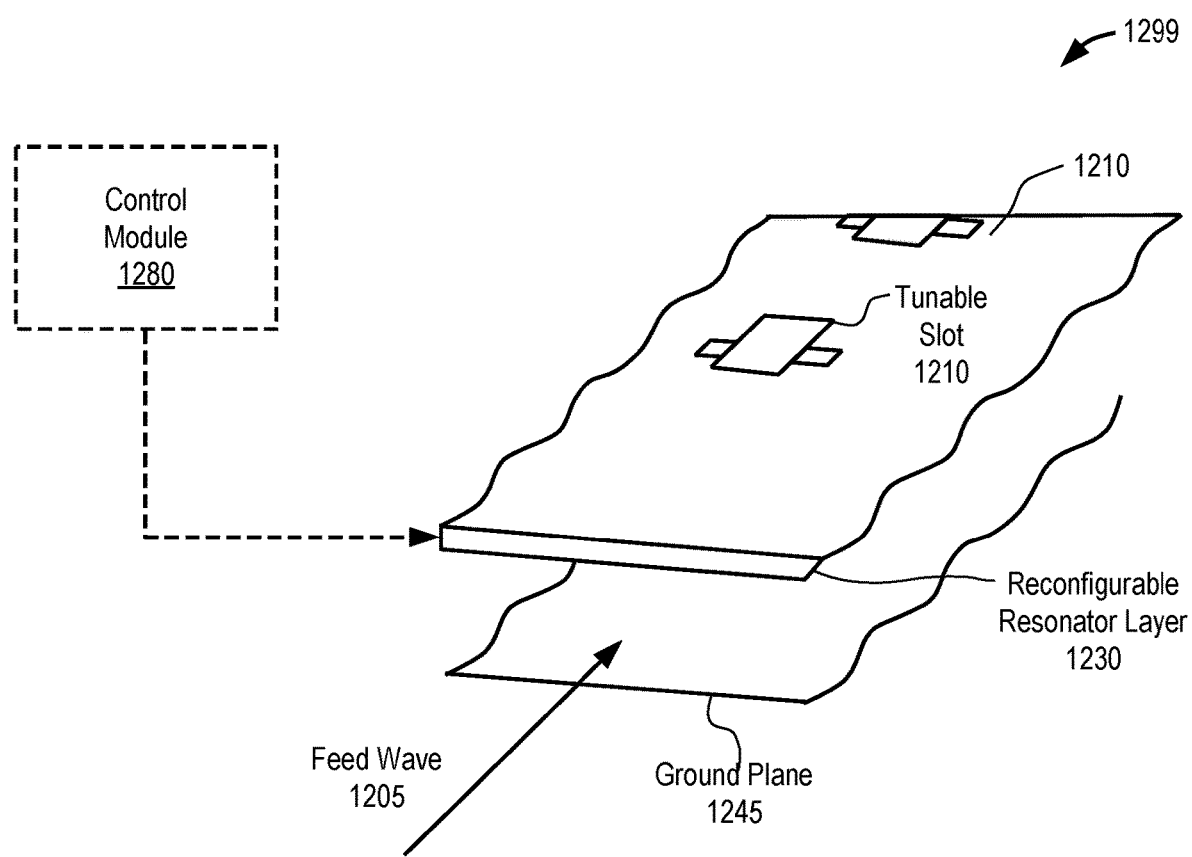
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
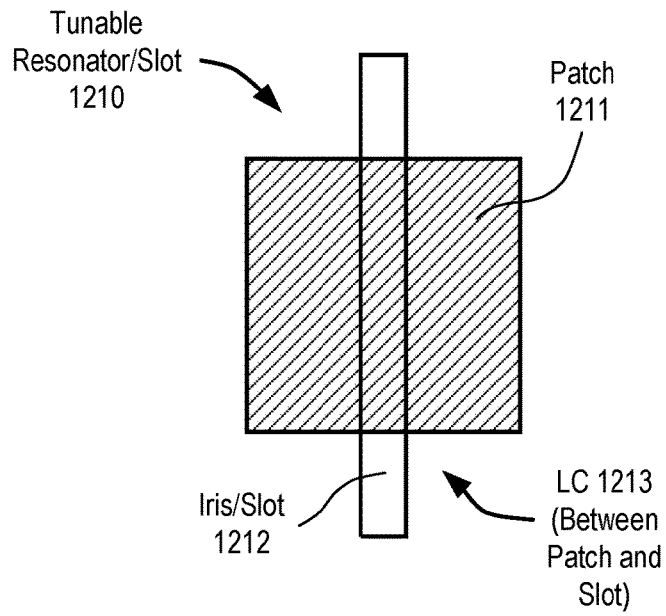
FIG. 8A illustrates one embodiment of a tunable resonator/slot.

Control module, or controller, 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
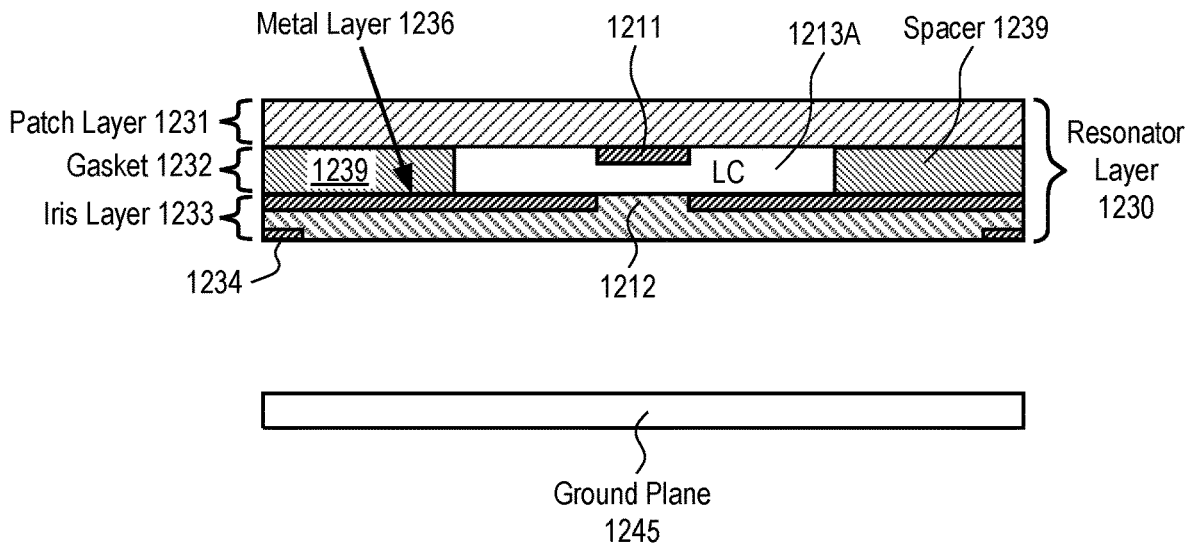
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 1A. Note that in this example the antenna array has two different types of antenna elements that are used for two different types of frequency bands.

Figure 9A:
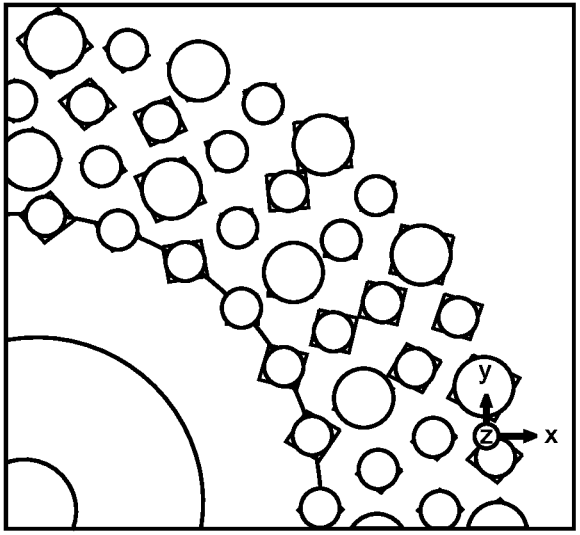
FIGS. 9A-D illustrate one embodiment of the different layers for creating the slotted array.
Figure 9B:
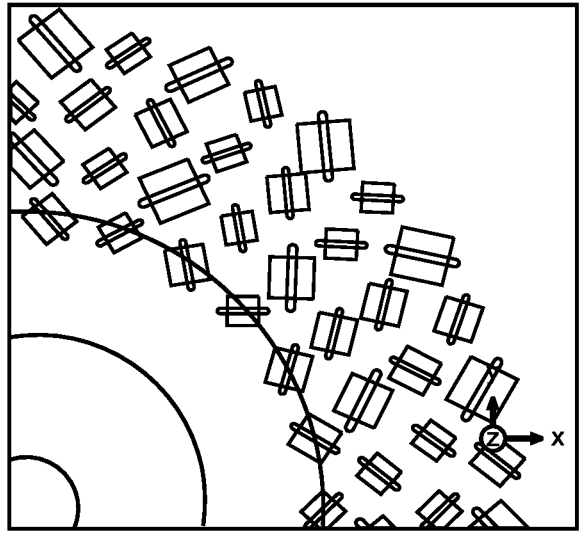
Figure 9C:
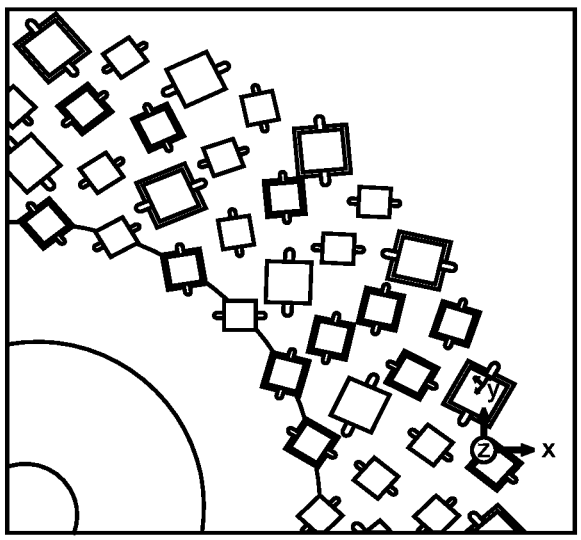
Figure 9D:
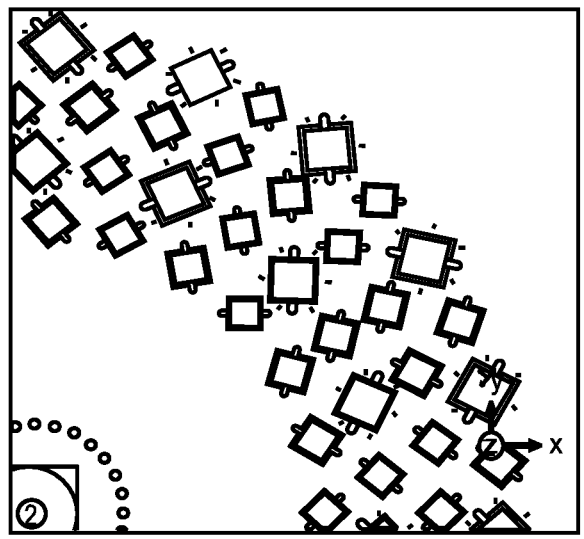

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
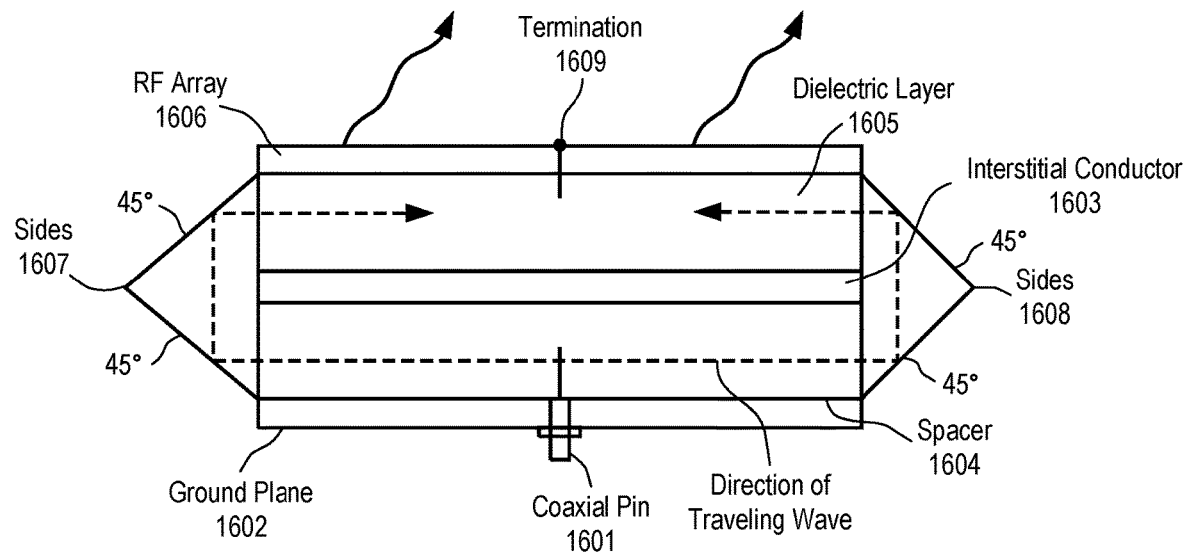
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave fed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
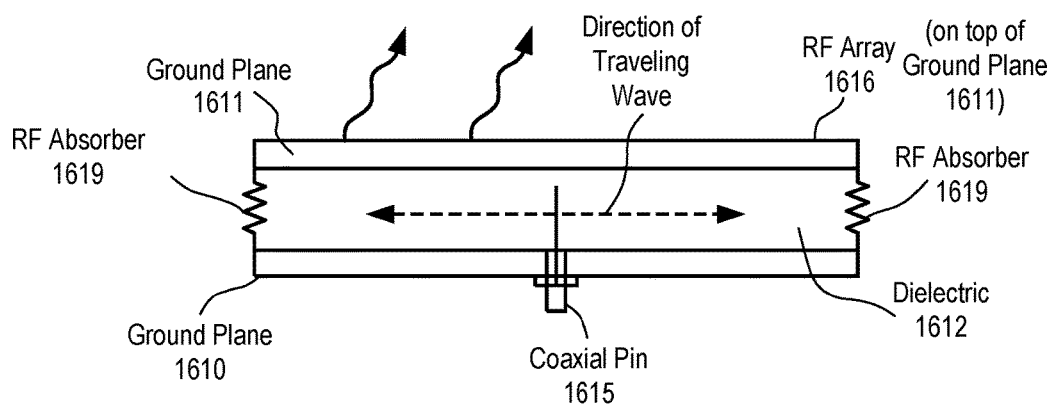
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELL") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
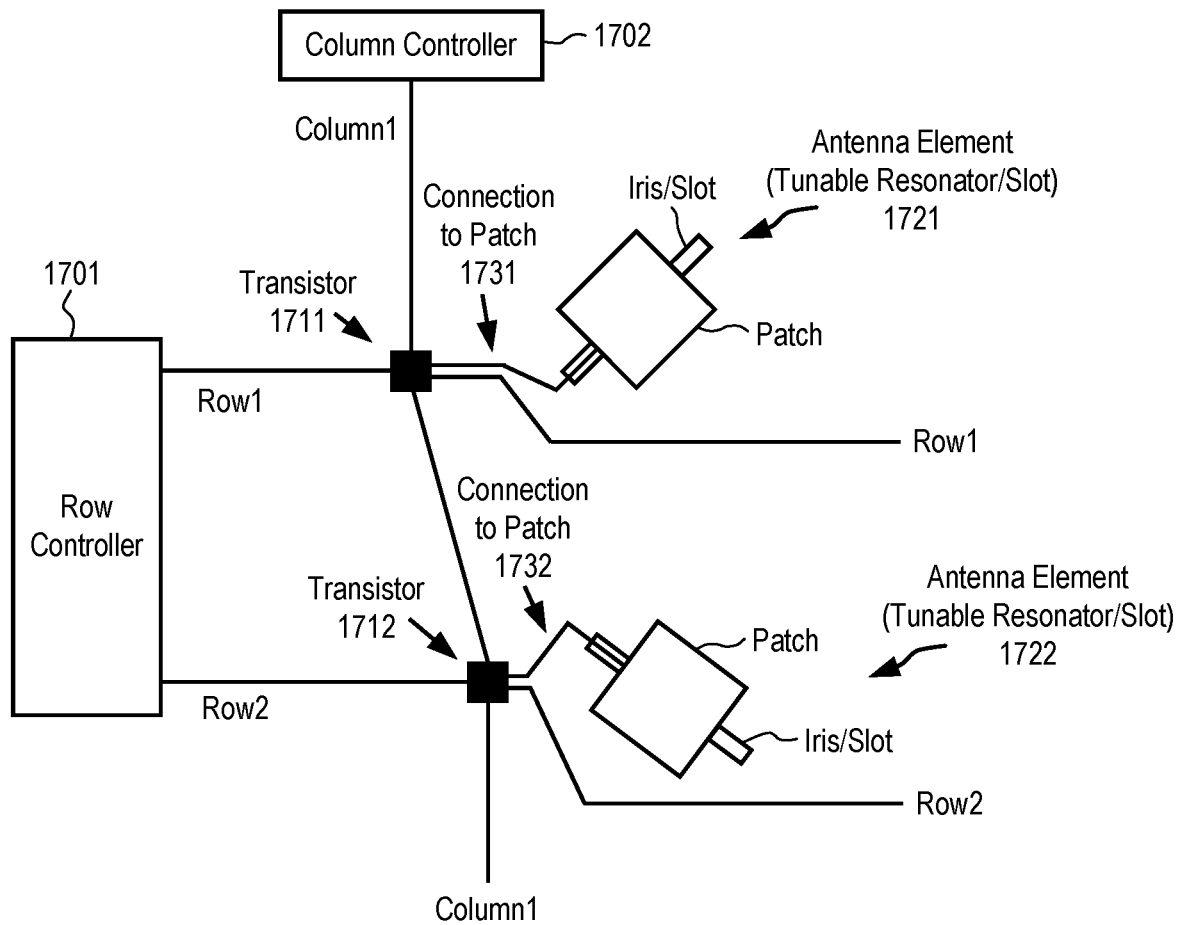
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
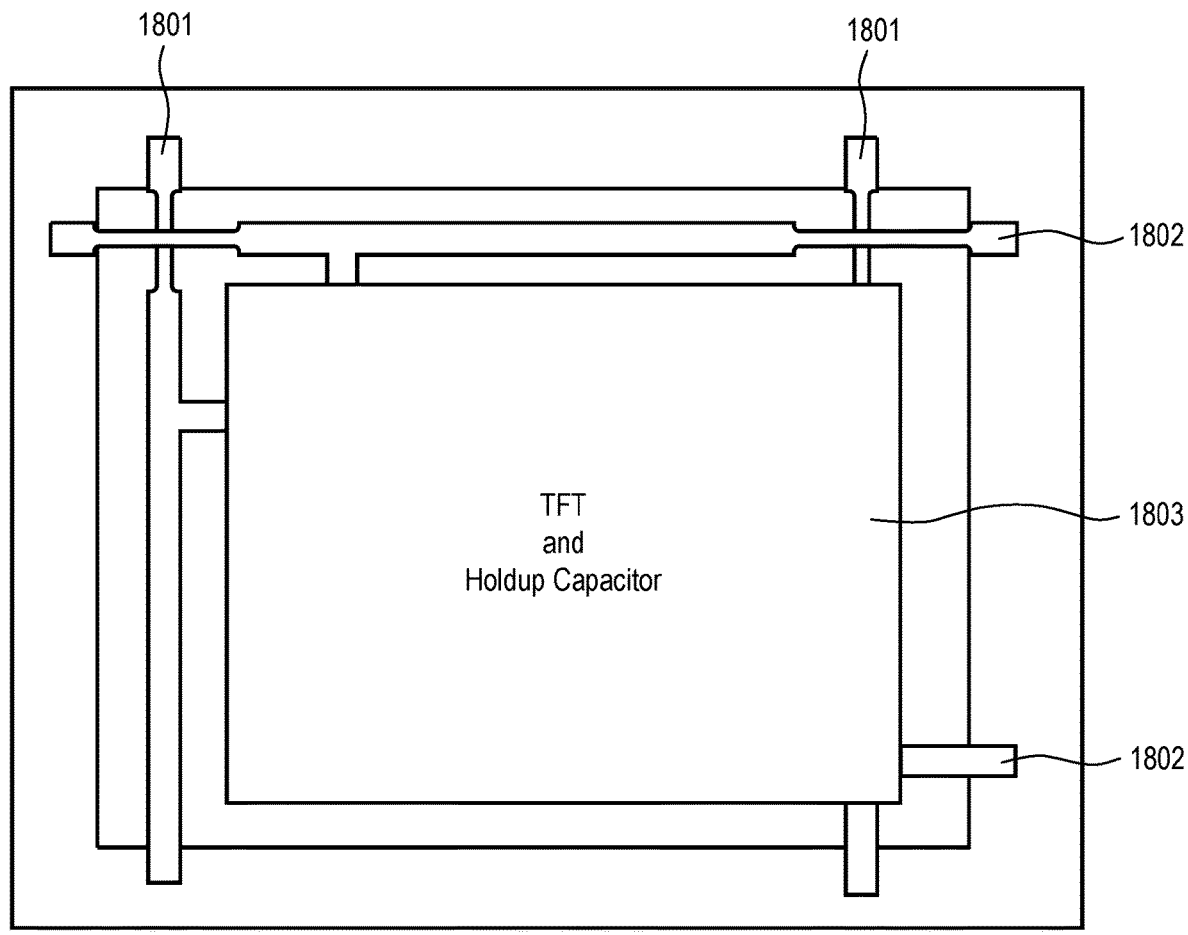
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
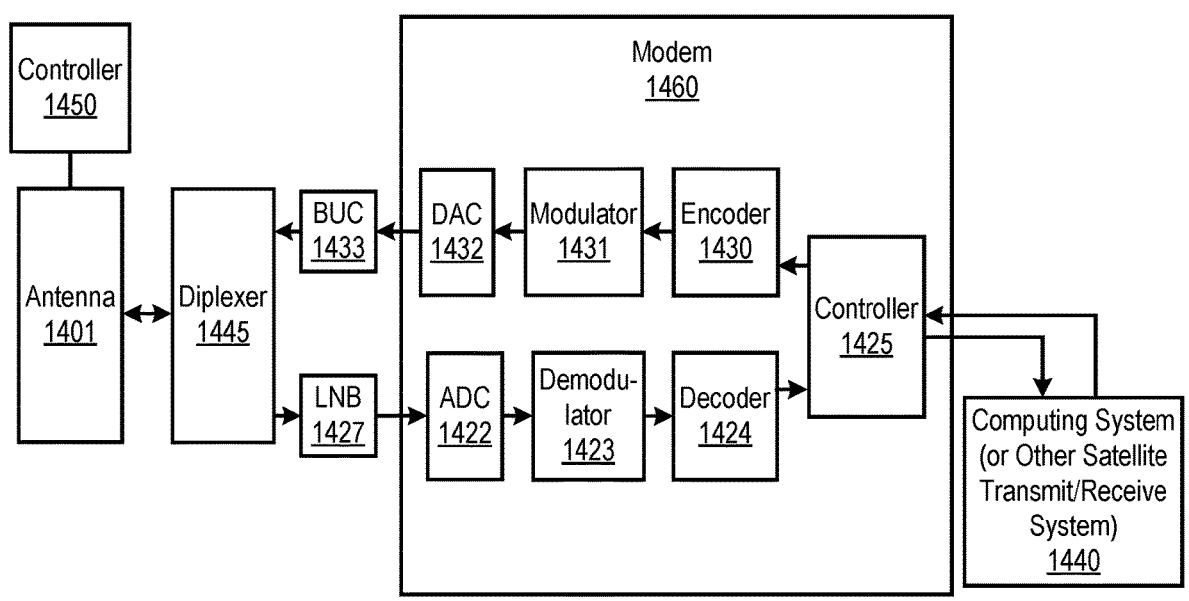
FIG. 14 is a block diagram of one embodiment of a communication system having simultaneous transmit and receive paths.

In another embodiment, the combined antenna apertures are used in a full duplex communication system. FIG. 14 is a block diagram of an embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is a method comprising generating a first beam with a single electronically steered flat-panel antenna to track a first satellite; generating a second beam with the single electronically steered flat-panel antenna to track a second satellite simultaneously while generating the first beam to track the first satellite; and handing off traffic from the first satellite to the second satellite.

Example 2 is the method of example 1 that may optionally include that handing off traffic is performed seamlessly such that connectivity is maintained throughout the transition from the first satellite to the second satellite.

Example 3 is the method of example 1 that may optionally include prior to generating the second beam to track the second satellite, generating the second beam to acquire a signal from the second satellite while generating the first beam.

Example 4 is the method of example 3 that may optionally include generating first and second patterns to apply to first and second sets of radio-frequency (RF) radiating antenna elements, respectively, on an antenna aperture of the electronically steered flat-panel antenna to generate the first and second beams, respectively, to point at carrier frequencies that differ in frequency, wherein the RF radiating antenna elements of the first and second sets are different.

Example 5 is the method of example 4 that may optionally include that the first and second sets of RF radiating antenna elements have a different number of RF radiating antenna elements.

Example 6 is the method of example 4 that may optionally include that RF radiating antenna elements of the first and second sets of RF radiating antenna elements are arbitrarily distributed on the antenna aperture.

Example 7 is the method of example 4 that may optionally include that the first and second sets of RF radiating antenna elements are in rings around a central feed for a wave, and further wherein each ring of the first set of RF radiating antenna elements is between rings of RF radiating antenna elements in the second set of RF radiating antenna elements.

Example 8 is the method of example 4 that may optionally include that the first and second sets of RF radiating antenna elements are in rings around a central feed for a wave, with the first set of RF radiating antenna elements being in rings closest to the central feed in comparison to rings of the second set of RF radiating antenna elements.

Example 9 is the method of example 3 that may optionally include that the second beam is pointed to a predicted location of the second satellite.

Example 10 is the method of example 9 that may optionally include that the predicted location is based on commanded two-line elements (TLE).

Example 11 is the method of example 3 that may optionally include that generating the first and second beams have different antenna gains, wherein gain for the second beam is lower than gain for the first beam when the second beam is used for acquiring the signal from the second satellite.

Example 12 is the method of example 3 that may optionally include that the second beam is wider than the first beam when used for acquiring the signal from the second satellite.

Example 13 is the method of example 1 that may optionally include prior to generating the first beam to track the first satellite, operating the electronically steered flat-panel antenna in a single-beam configuration in which the electronically steered flat-panel antenna is generating a single beam, including generating a third beam to track the second satellite using a first set of RF radiating antenna elements on an antenna aperture of the electronically steered flat-panel antenna, the first set of RF radiating antenna elements including RF radiating elements of a second set of RF radiating elements on the antenna aperture for generating the first beam and RF radiating elements of a third set of RF radiating elements on the antenna aperture for generating the second beam; and determining to switch the electronically steered flat-panel antenna to a two-beam configuration in which the electronically steered flat-panel antenna is generating the first and second beams.

Example 14 is the method of example 13 that may optionally include that the first set of RF radiating antenna elements includes the second and third set of RF radiating elements.

Example 15 is an antenna for use in satellite communication, the antenna comprising: an electronically steered flat-panel antenna aperture with a plurality of electronically controlled radio frequency (RF) radiating antenna elements; and one or more processors coupled to the antenna aperture to control the antenna aperture to generate a first beam with the antenna aperture to track a first satellite, to generate a second beam with the antenna aperture to track a second satellite simultaneously while generating the first beam to track the first satellite, and to hand off traffic from the first satellite to the second satellite.

Example 16 is the antenna of example 15 that may optionally include that the one or more processors are operable to hand off traffic seamlessly between the first and second satellites such that connectivity is maintained throughout the transition from the first satellite to the second satellite.

Example 17 is the antenna of example 15 that may optionally include, prior to generating the second beam to track the second satellite, the one or more processors control the antenna aperture to generate the second beam to acquire a signal from the second satellite while generating the first beam.

Example 18 is the antenna of example 17 that may optionally include that the one or more processors are operable to generate first and second patterns to apply to first and second sets of first and second sets of radio-frequency (RF) radiating antenna elements, respectively, of the antenna aperture to generate the first and second beams, respectively, to point at carriers frequencies that differ in frequency, wherein the RF radiating antenna elements of the first and second sets are different.

Example 19 is the antenna of example 18 that may optionally include that the first and second sets of RF radiating antenna elements have a different number of RF radiating antenna elements.

Example 20 is the antenna of example 18 that may optionally include that the first and second sets of RF radiating antenna elements are in rings around a central feed for a wave, and further wherein each ring of the first set of RF radiating antenna elements is between rings of RF radiating antenna elements in the second set of RF radiating antenna elements.

Example 21 is the antenna of example 18 that may optionally include that the first and second sets of RF radiating antenna elements are in rings around a central feed for a wave, with the first set of RF radiating antenna elements being in rings closest to the central feed in comparison to rings of the second set of RF radiating antenna elements.

Example 22 is the antenna of example 15 that may optionally include that the second beam is pointed to a predicted location of the second satellite.

Example 23 is the antenna of example 22 that may optionally include that the predicted location is based on commanded two-line elements (TLE).

Example 24 is the antenna of example 15 that may optionally include that the first and second beams have different antenna gains, wherein gain for the second beam is lower than gain for the first beam when the second beam is used for acquiring the signal from the second satellite.

Example 25 is the antenna of example 15 that may optionally include that the second beam is wider than the first beam when used for acquiring a signal from the second satellite.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use in satellite communication, the method comprising:
generating a first beam with a single electronically steered flat-panel antenna to track a first satellite;
generating a second beam with the single electronically steered flat-panel antenna to track a second satellite simultaneously while generating the first beam to track the first satellite, direction of the first and second beams being electronically controlled by the single electronically steered flat-panel antenna that electronically scans in two dimensions; and
handing off traffic from the first satellite to the second satellite.

2. The method defined in claim 1 wherein handing off traffic is performed seamlessly such that connectivity is maintained throughout the transition from the first satellite to the second satellite.

3. The method defined in claim 1 further comprising:
prior to generating the second beam to track the second satellite, generating the second beam to acquire a signal from the second satellite while generating the first beam.

4. The method defined in claim 3 further comprising generating first and second patterns to apply to first and second sets of radio-frequency (RF) radiating antenna elements, respectively, on an antenna aperture of the electronically steered flat-panel antenna to generate the first and second beams, respectively, to point at carrier frequencies that differ in frequency, wherein the RF radiating antenna elements of the first and second sets are different.

5. The method defined in claim 4 wherein the first and second sets of RF radiating antenna elements have a different number of RF radiating antenna elements.

6. The method defined in claim 4 wherein RF radiating antenna elements of the first and second sets of RF radiating antenna elements are arbitrarily distributed on the antenna aperture.

7. The method defined in claim 4 wherein the first and second sets of RF radiating antenna elements are in rings around a central feed for a wave, and further wherein each ring of the first set of RF radiating antenna elements is between rings of RF radiating antenna elements in the second set of RF radiating antenna elements.

8. The method defined in claim 4 wherein the first and second sets of RF radiating antenna elements are in rings around a central feed for a wave, with the first set of RF radiating antenna elements being in rings closest to the central feed in comparison to rings of the second set of RF radiating antenna elements.

9. The method defined in claim 3 wherein the second beam is pointed to a predicted location of the second satellite.

10. The method defined in claim 9 wherein the predicted location is based on commanded two-line elements (TLE).

11. The method defined in claim 3 wherein generating the first and second beams have different antenna gains, wherein gain for the second beam is lower than gain for the first beam when the second beam is used for acquiring the signal from the second satellite.

12. The method defined in claim 3 wherein the second beam is wider than the first beam when used for acquiring the signal from the second satellite.

13. The method defined in claim 1 further comprising:
prior to generating the first beam to track the first satellite, operating the electronically steered flat-panel antenna in a single-beam configuration in which the electronically steered flat-panel antenna is generating a single beam, including generating a third beam to track the second satellite using a first set of RF radiating antenna elements on an antenna aperture of the electronically steered flat-panel antenna, the first set of RF radiating antenna elements including RF radiating elements of a second set of RF radiating elements on the antenna aperture for generating the first beam and RF radiating elements of a third set of RF radiating elements on the antenna aperture for generating the second beam; and
determining to switch the electronically steered flat-panel antenna to a two-beam configuration in which the electronically steered flat-panel antenna is generating the first and second beams.

14. The method defined in claim 13 wherein the first set of RF radiating antenna elements includes the second and third set of RF radiating elements.

15. An antenna for use in satellite communication, the antenna comprising:

an electronically steered flat-panel antenna aperture with a plurality of electronically controlled radio frequency (RF) radiating antenna elements; and
one or more processors coupled to the antenna aperture to control the antenna aperture to generate a first beam with the antenna aperture to track a first satellite, to generate a second beam with the antenna aperture to track a second satellite simultaneously while generating the first beam to track the first satellite, and to hand off traffic from the first satellite to the second satellite, wherein direction of the first and second beams is electronically controlled by the single electronically steered flat-panel antenna that electronically scans in two dimensions.

16. The antenna defined in claim 15 wherein the one or more processors are operable to hand off traffic seamlessly between the first and second satellites such that connectivity is maintained throughout the transition from the first satellite to the second satellite.

17. The antenna defined in claim 15 wherein, prior to generating the second beam to track the second satellite, the one or more processors control the antenna aperture to generate the second beam to acquire a signal from the second satellite while generating the first beam.

18. The antenna defined in claim 17 wherein the one or more processors are operable to generate first and second patterns to apply to first and second sets of first and second sets of radio-frequency (RF) radiating antenna elements, respectively, of the antenna aperture to generate the first and second beams, respectively, to point at carriers frequencies that differ in frequency, wherein the RF radiating antenna elements of the first and second sets are different.

19. The antenna defined in claim 18 wherein the first and second sets of RF radiating antenna elements have a different number of RF radiating antenna elements.

20. The antenna defined in claim 18 wherein the first and second sets of RF radiating antenna elements are in rings around a central feed for a wave, and further wherein each ring of the first set of RF radiating antenna elements is between rings of RF radiating antenna elements in the second set of RF radiating antenna elements.

21. The antenna defined in claim 18 wherein the first and second sets of RF radiating antenna elements are in rings around a central feed for a wave, with the first set of RF radiating antenna elements being in rings closest to the central feed in comparison to rings of the second set of RF radiating antenna elements.

22. The antenna defined in claim 15 wherein the second beam is pointed to a predicted location of the second satellite.

23. The antenna defined in claim 22 wherein the predicted location is based on commanded two-line elements (TLE).

24. The antenna defined in claim 15 wherein the first and second beams have different antenna gains, wherein gain for the second beam is lower than gain for the first beam when the second beam is used for acquiring the signal from the second satellite.

25. The antenna defined in claim 15 wherein the second beam is wider than the first beam when used for acquiring a signal from the second satellite.

* * * * *